United States Patent Office 3,396,211
Patented Aug. 6, 1968

3,396,211
COMPOSITIONS OF POLYVINYL CHLORIDE AND RANDOMLY CHLORINATED POLYETHYLENE
Sergio Bonotto, Princeton, and Eric R. Wagner, Basking Ridge, N.J., assignors to Union Carbide Corporation, a corporation of New York
No Drawing. Continuation of application Ser. No. 354,444, Mar. 24, 1964. This application July 28, 1967, Ser. No. 656,945
1 Claim. (Cl. 260—897)

ABSTRACT OF THE DISCLOSURE

A vinyl chloride composition of improved impact strength comprising a vinyl chloride polymer and polyethylene randomly chlorinated in particle form at temperatures ranging from 20° C. to 75° C.

---

The present application is a continuation of application Ser. No. 354,444, filed Mar. 24, 1964, now abandoned.

This invention relates to polyvinyl chloride compositions. More specifically, this invention relates to polyvinyl chloride compositions characterized by improved impact strength, high tensile strength, high tensile modulus, good elevated temperature performance, good resistance to weathering, and good processability.

Rigid polyvinyl chloride by itself is brittle and exhibits poor impact strength. For example, when a sheet of rigid polyvinyl chloride at room temperature, about 23° C., is struck against the corner of a table, it will crack badly. This tendency to crack becomes even more pronounced at lower temperatures. To cope with this problem, various modifiers have been proposed to improve the impact strength of rigid polyvinyl chloride. It has been found that some modifiers are unsuitable because they are incompatible with rigid polyvinyl chloride in that homogeneous mixtures of the resin and modifier cannot be attained over wide temperature ranges. Other modifiers that have been found to be compatible with rigid polyvinyl chloride are also found to undesirably decrease tensile strength, tensile modulus (stiffness), elevated temperature performance, and weathering resistance thereby decreasing the end uses of the composition. Still other compatible modifiers have been found to impair the impact strength of rigid polyvinyl chloride. For example, Australian Patent 233,811 discloses that chlorinated polyolefins, prepared by chlorinating a suspension of a polyolefin in water at temperatures of up to 90° C., will actually impair the impact strength of a polyvinyl chloride composition when admixed therewith. The impact strength is impaired to an extent that sheets prepared from such a composition will break when exposed to the slightest impact whereas rigid polyvinyl chloride will break only when exposed to a stronger impact.

The present invention provides a modifier which overcomes the difficulties heretofore met with other modifiers. Consequently, polyvinyl chloride compositions of the present invention are adaptable to a wider range of commercial applications than prior compositions. Polyvinyl chloride compositions of the present invention have greatly improved impact strength and at the same time have high tensile strength, high tensile modulus, good elevated temperature performance evidenced by a high heat distortion temperature, and good resistance to weathering. Stated differently, the present invention provides a modifier for polyvinyl chloride compositions which greatly improves impact strength without materially impairing the desirable inherent properties of polyvinyl chloride as has been the case with prior modifiers. In addition, the modifier of the present invention is physically compatible with rigid polyvinyl chloride over a wide temperature range which lends good processability to the compositions of the present invention.

Broadly, polyvinyl chloride compositions of the present invention comprise polyvinyl chloride and from about 1.0% to about 30%, preferably from about 2.0% to about 25%, based on the weight of the composition, of randomly chlorinated, high molecular weight polyethylene. Amounts in excess of 30% are not preferred because the properties of randomly chlorinated polyethylene become evident while those of the polyvinyl chloride are suppressed.

The phrase "randomly chlorinated polyethylene" is descriptive of the manner in which the compound is prepared and refers to the haphazard distribution of chlorine atoms along a given polymer chain of polyethylene. In contrast, the phrase "non-randomly chlorinated polyethylene" refers to the regular distribution of chlorine atoms along a polymer chain.

Vinyl chloride polymers, referred to herein as "polyvinyl chloride" for purposes of simplification, useful in the present invention include homopolymers of vinyl chloride as well as copolymers thereof, especially those which contain a major portion of vinyl chloride. Exemplary of monomers copolymerizable with vinyl chloride are vinyl acetate, vinylidene chloride, maleic and fumaric esters, acrylonitrile, vinyl alkyl ethers, olefin monomers such as ethylene and propylene, and the like.

Polyvinyl chloride used in the present invention can be prepared by any of several methods well known in the art, as for example by the polymerization of vinyl chloride in bulk, solution, suspension, emulsion, or according to the processes disclosed in U.S. Patents 2,075,429 to S. D. Douglas and 2,345,659 and 2,345,660 to A. W. Downes which are incorporated herein by reference.

According to the present invention, polyethylene which is randomly chlorinated is characterized by a high molecular weight evidenced by a melt index of from about 0.001 to about 1.0, preferably from about 0.01 to about 0.5. As used herein and in appended claims, melt index is expressed in decigrams per minute, measured at 190° C. and 44 p.s.i.g. according to the test method set forth in ASTM D1238–57T. While all types of polyethylene are useful in the present invention, it is preferred to use what is known as low-density polyethylene, that is polyethylene having a density ranging from about 0.916 to about 0.935, preferably from about 0.918 to about 0.925. Low-density polyethylene, which is also known as "branched" polyethylene, can be produced by polymerizing ethylene under high pressure, for example, as disclosed in U.S. Patent 2,153,553 to Fawcett et al., issued Apr. 1, 1939, which is incorporated herein by reference. Low density polyethylene is preferred for economical and practical reasons. This is because it has been found that low-density polyethylene, when randomly chlorinated, as in Example 1 infra, yields a modifier which is more rubber-like and hence more easily compounded with polyvinyl chloride compositions than modifiers prepared from other types of polyethylene.

Randomly chlorinated polyethylene used in the present invention generally has a chlorine content of from about 30% to about 45% by weight, preferably from about 33% to about 38% by weight. It has been found that a chlorine content of less than 30% is undesirable because it tends to render randomly chlorinated polyethylene incompatible with rigid polyvinyl chloride while a chlorine content greater than 45% is undesirable because it tends to have a plasticizing effect on rigid polyvinyl chloride.

Randomly and non-randomly chlorinated polyethylene differ greatly in physical properties as is revealed by Oakes et al. in Trans. Faraday Soc., 42A, 197–205 (1946), which is incorporated herein by reference. It is believed that this difference is properties stems from the manner in which polyethylene is chlorinated. Generally, non-randomly chlorinated polyethylene is obtained by passing chlorine gas thru a solution of polyethylene in carbon tetrachloride, for example, at relatively high temperatures. On the other hand, randomly chlorinated polyethylene is obtained by passing chlorine gas thru a fluidized or agitated bed of polyethylene or a suspension of polyethylene in a non-solvent such as water, acetic acid, and the like, at temperatures lower than those used for non-random chlorination. For this reason, it is sometimes said that randomly chlorinated polyethylene is produced by a "cold" solid or bulk process whereas the non-randomly chlorinated polyethylene is produced by a "hot" solution process. Generally, polyethylene is randomly chlorinated in a fluidized or agitated bed or suspended in a non-solvent at temperatures ranging from about 20° C. to about 75° C. The agitated bed method of random chlorination is discussed in Example 1 infra, and the suspension method in Oakes et al., supra.

In the non-random chlorination of polyethylene in solution, chlorination first occurs indiscriminately along the polymer chain, all hydrogen atoms being equally likely to be replaced by chlorine atoms. An indication of the distribution of the chlorine atoms along the polymer chain can be had from an infrared spectrum which show that as the chlorine content increases, a band at 660 cm.$^{-1}$, characteristic of —CCl$_2$— groups, increases relative to a band at 620 cm.$^{-1}$, characteristic of —CHCl— groups, and to a band at 1460 cm.$^{-1}$, characteristic of —CH$_2$— groups. In addition, there is a decrease in a band at 722 cm.$^{-1}$ which is characteristic of four or more methylene (—CH$_2$—) groups, and this band eventually disappears as the chlorine content increases.

In the random chlorination of polyethylene, indiscriminate chlorination does not occur. The individual particles of polyethylene are made up of crystalline and amorphous regions and the attack of the chlorine atoms becomes concentrated on the amorphous regions. As more chlorine is added, the distribution of chlorine atoms along the polymer chain is different from that of non-random chlorination. This difference can be represented graphically as follows:

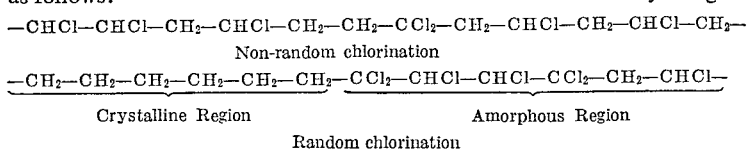

Non-random chlorination

Crystalline Region      Amorphous Region

Random chlorination

In addition there is a difference in the chlorine content of the component molecules of randomly chlorinated polyethylene. The molecules near the surface of a polyethylene particle will be more heavily chlorinated than those towards the center of the particle. Consequently, greater lengths of the polymer chain will be unchlorinated than occurs in non-random chlorination. The greater proportion of unchlorinated chain means that there is a greater concentration of chlorine atoms, and therefore a greater proportion of —CCl$_2$— groups or adjacent —CHCl— groups. This difference in chlorine atom distribution is also evidenced by higher softening and melting points for a randomly chlorinated polyethylene of a given chlorine content as compared to a non-randomly chlorinated polyethylene having the same chlorine content.

The behavior of randomly chlorinated polyethylene as used in the present invention as an impact modifier for rigid polyvinyl chloride is completely unpredictable in view of the teachings of the Australian patent mentioned supra. The present invention resulted from the unexpected discovery that randomly chlorinated, high molecular weight polyethylene greatly improves impact strength of polyvinyl chloride compositions without materially impairing the desirable inherent properties of rigid polyvinyl chloride.

The addition of randomly chlorinated polyethylene to a polyvinyl chloride composition can be accomplished by any known means which will produce a homogeneous mixture. For example, admixing of the components can be done with a 2-roll mill, Banbury mill, an extruder, and the like.

For some end uses, it is desirable to include a plasticizer for polyvinyl chloride in the compositions of the present invention. Any known plasticizer for polyvinyl chloride may be used, exemplary of which are dioctyl phthalate, dioctyl adipate, tricresyl phosphate, polypropylene glycol sebacate, and the like.

If desired, the compositions of the present invention can contain various additives as is well known in the art. Such additives can be, for example, stabilizers, lubricants, anti-oxidants, pigments, ultra-violet light adsorbents, carbon black, waxes, clays, and the like.

Polyvinyl chloride compositions of the present invention are capable of being melt fabricated by any of several well known methods into a variety of useful shapes. For example, the compositions of the present invention can be extruded into film and sheet, blow molded into bottles and the like, melt compression molded, thermoformed, injection molded and the like. Because the compositions of the present invention offer high impact strength, high tensile modulus and good resistance to weathering, they are especially suited for molding into pipe and conduit.

In the examples below the following ASTM procedures were followed in obtaining the data given in the tables.

Heat distortion temperature _____ ASTM D648–45T
Melt index _____ ASTM D1238–57T
Notched-bar impact strength _____ ASTM D256–56
Tensile modulus _____ ASTM D882–TC
Tensile strength _____ ASTM D638–58T The following examples are provided as exemplary of the present invention and are not intended to limit the scope thereof in any manner. All percentages given are by weight unless indicated otherwise.

Example 1.—Preparation of randomly chlorinated polyethylene

Particles of 25 mesh polyethylene having a melt index of 0.11 and a density of 0.921 were charged into a five-gallon reactor equipped with an agitator. While the polyethylene particles were agitated, dry chlorine gas was passed therethru at the rate of 0.44 standard cubic foot per hour per pound of resin charged for a period of ten hours. The temperature in the reactor was maintained at 50° C. for the first hour, 40° C. for the second hour, 60° C. for the next six hours, and 65° C. for the last two hours. After termination of the chlorination reaction, the randomly chlorinated polyethylene product was recovered and analyzed. Infrared analysis showed a strong adsorption at 660 cm.$^{-1}$ which indicated a large proportion of —CCl$_2$— groups in the randomly chlorinated product. Other data obtained are summarized in the table below.

For purposes of comparison, polyethylene as described above was dissolved in carbon tetrachloride solvent and chlorinated as described above for a period of five and one-half hours at a temperature of 93° C. After termination of the chlorination reaction, the non-randomly chlorinated polyethylene product was recovered and analyzed. The results are summarized below.

|  | Randomly Chlorinated Polyethylene | Non-Randomly Chlorinated Polyethylene |
| --- | --- | --- |
| Percent Chlorine | 33 | 33 |
| Melt Index | 0.03 | No Flow |
| Softening Point, °C | 110 | 106 |
| Melting Point, °C | 186 | 178 |

The results illustrate the difference in physical properties between randomly and non-randomly chlorinated high molecular weight polyethylene of the same melt index and density.

Example 2

The randomly and non-randomly chlorinated polyethylene prepared in Example 1 were incorporated into a polyvinyl chloride composition having the following components and weight amounts.

| Component | Composition A | Composition B | Control I |
| --- | --- | --- | --- |
| Polyvinyl Chloride Having a Specific Viscosity of 0.24 in Cyclohexanone, g | 300 | 300 | 300 |
| Stearic Acid, g | 3.8 | 3.8 | 3.8 |
| Dibutyl Tin Maleate Heat Stabilizer, g | 9.8 | 9.8 | 9.8 |
| Polymethyl Methacrylate, g | 6.3 | 6.3 | 6.3 |
| TiO₂ Pigment, g | 7.0 | 7.0 | 7.0 |
| Carbon Black, g | 0.7 | 0.7 | 0.7 |
| Randomly Chlorinated Polyethylene, g | 15.8 (5%) |  |  |
| Non-Randomly Chlorinated Polyethylene, g |  | 15.8 (5%) |  |

Compositions A and B were prepared as follows: prior to the addition of a chlorinated polyethylene, the components were thoroughly mixed on a two-roll mill at 171° C. and then fluxed for two minutes. After the addition of a chlorinated polyethylene, the mixture was blended for an additional two minutes and allowed to cool. Control I was prepared in the same manner without the addition of a chlorinated polyethylene. Compression molded samples of compositions A and B and control I were then prepared and the physical properties of each determined. The results are summarized below.

|  | Composition A [1] | Composition B [2] | Control I |
| --- | --- | --- | --- |
| Notched-Bar Impact Strength, ft.-lbs./in. at 25° C | 22 | 24 | 0.8–1.2 |
| Heat Distortion Temperature, °C. at 264 p.s.i | 72.2 | 68.5 | 70–72 |
| Tensile Modulus, p.s.i | 340,000 | 317,000 | 389,000 |

[1] Containing randomly chlorinated polyethylene modifier.
[2] Containing non-randomly chlorinated polyethylene modifier.

This example demonstrates that while the modifiers of compositions A and B both improve impact strength to substantially the same level, the modifier of composition B, non-randomly chlorinated polyethylene, has a marked effect on elevated temperature performance as is indicated by the drop in heat distortion temperature and impairs tensile modulus to a much greater degree than the modifier of composition A, randomly chlorinated polyethylene. This example then shows that randomly chlorinated polyethylene is a far better impact modifier for polyvinyl chloride because it does not materially impair the desirable inherent properties of polyvinyl chloride as has been the case with other modifiers such as the modifier of composition B.

Example 3

For purposes of comparison, a commercially available impact modifier for rigid polyvinyl chloride was testetd against the modifier of the present invention. The commercially available modifier was non-randomly chlorinated polyethylene having a chlorine content of 32% and a melt index of 5.0. Randomly chlorinated polyethylene as described in Example 1 was used as the modifier of the present invention.

The compositions tested comprised the following components and weight amounts:

| Component | Composition C | Composition D | Control II |
| --- | --- | --- | --- |
| Polyvinyl Chloride Having a Specific Viscosity of 0.24 in Cyclohexanone, g | 4,000 | 4,000 | 4,000 |
| Stearic Acid, g | 50 | 50 | 50 |
| Dibutyl Tin Maleate Heat Stabilizer, g | 126 | 126 | 126 |
| Polymethyl Methacrylate, g | 84 | 84 | 84 |
| Pigment (Mixture of TiO₂ and Carbon Black), g | 102.6 | 102.6 | 102.6 |
| Randomly Chlorinated Polyethylene, g | 210 (4.6%) |  |  |
| Non-Randomly Chlorinated Polyethylene, g |  | 210 (4.6%) |  |

Compositions C and D were prepared as follows: prior to the addition of a chlorinated polyethylene, the components were thoroughly mixed on a two-roll mill at 171° C. and then fluxed for two minutes. After the addition of a chlorinated polyethylene, the mixture was blended for an additional two minutes and allowed to cool. Control II was prepared as above without the addition of a chlorinated polyethylene. Compression molded samples of compositions C and D and control II were then prepared and the physical properties of each determined. The results are summarized below.

|  | Composition C [1] | Composition D [2] | Control II |
| --- | --- | --- | --- |
| Notched-Bar Impact Strength, ft.-lbs./in. at 25° C | 23.0 | 14.7 | 0.5–1.0 |
| Tensile Strength, p.s.i | 6,700 | 6,200 | 9,000 |

[1] Containing randomly chlorinated polyethylene modifier.
[2] Containing non-randomly chlorinated polyethylene modifier.

In addition, composition C containing randomly chlorinated polyethylene had a heat distortion temperature of 70.6° C. at 264 p.s.i. This example demonstrates the superior results that are attained with the modifier of the present invention over a commercially available non-randomly chlorinated polyethylene modifier. There was a 65% improvement in impact strength and an increase in tensile strength. Good elevated temperature performance of composition C is also evident from the heat distortion temperature.

Example 4

Polyethylene having a melt index of 0.03 and polyethylene having a melt index of 80 were randomly chlorinated as described in Example 1. Each had a chlorine content of 30–33%. Varying amounts of these randomly chlorinated polyethylenes, given in the table below, were then admixed as described in Example 3 with polyvinyl chloride having a specific viscosity of 0.24 in cyclohexanone. Compression molded samples of each composition were then prepared. The physical properties of each sample were then determined and these are given below.

| Percent of randomly chlorinated polyethylene based on the weight of the composition | Melt index of polyethylene before random chlorination | Notched-bar impact strength, ft.-lbs./in. at 25°C. |
| --- | --- | --- |
| 2.4 | 0.03 | 13.3 |
| 4.6 | 0.03 | 20.0 |
| 8.9 | 0.03 | 18.9 |
| 2.4 | 80 | 3.1 |
| 4.6 | 80 | 3.3 |
| 8.9 | 80 | 2.4 |

This example demonstrates that high molecular weight polyethylene having a low melt index, e.g., below about 1.0, when randomly chlorinated as described herein becomes a highly effective impact modifier for rigid polyvinyl chloride compositions as compared to low molecular weight randomly chlorinated polyethylene having a high melt index.

Example 5

Several polyethylenes having different melt indices were randomly chlorinated as described in Example 1. Varying amounts of the modifiers so produced were admixed as described in Example 3 with polyvinyl chloride and compression molded test samples prepared. The samples were tested and the results are summarized below.

| Percent of randomly chlorinated polyethylene based on the weight of the composition | Melt index of polyethylene, before random chlorination | Chlorine content of polyethylene, percent by weight | Notched-bar impact strength ft.-lbs./in. at 25°C. |
|---|---|---|---|
| 10 | 2.0 | 20 | 0.5 |
| 25 | 0.3 | 20 | 1.1 |
| 10 | 0.03 | 33 | 18.9 |
| 5 | 0.03 | 36 | 23.2 |
| 5 | 0.03 | 38 | 22.1 |
| 5 | 0.03 | 42 | 20.1 |
| 10 | 0.13 | 27 | 2.9 |

This example demonstrates that randomly chlorinated polyethylene of low chlorine content, e.g., less than about 30% by weight, is not suitable as an impact modifier in the present invention. It was found that randomly chlorinated polyethylene having a chlorine content less than about 30% by weight is incompatible with rigid polyvinyl chloride which accounts for the low notched-bar impact strength values given in the table above for a 27% and 20% chlorine content.

What is claimed is:
1. Vinyl chloride composition of improved impact strength comprising vinyl chloride polymer and from about 1.0% to about 30.0%, based on the weight of said composition, of polyethylene chlorinated in particle form at temperatures ranging from about 20° C. to about 75° C. such that the attack of the chlorine atoms becomes concentrated in the amorphous regions of the polyethylene particles to a chlorine content of from about 30.0% to about 45.0% by weight, said polyethylene having, before chlorination, a melt index from about 0.001 to about 1.0 and a density of from about 0.916 to about 0.935 g./cc.

References Cited
UNITED STATES PATENTS

| | | | |
|---|---|---|---|
| 2,592,763 | 4/1952 | Taylor | 260—897 |
| 3,006,889 | 10/1961 | Frey | 260—897 |
| 3,145,187 | 8/1964 | Hankey et al. | 260—897 |
| 3,165,560 | 1/1965 | Frey et al. | 260—897 |
| 3,227,781 | 1/1966 | Klug et al. | 260—897 |
| 3,291,863 | 12/1966 | Frey et al. | 260—897 |

MURRAY TILLMAN, *Primary Examiner.*

C. J. SECCURO, *Assistant Examiner.*